(12) United States Patent
Sugimoto et al.

(10) Patent No.: US 12,365,261 B2
(45) Date of Patent: Jul. 22, 2025

(54) SERVER, CHARGING SYSTEM, AND COMPUTER READABLE RECORDING MEDIUM

(71) Applicant: TOYOTA JIDOSHA KABUSHIKI KAISHA, Toyota (JP)

(72) Inventors: Kazuhiro Sugimoto, Ashigarakami-gun (JP); Kotoru Sato, Susono (JP); Kumiko Katsumata, Susono (JP); Shun Ota, Susono (JP); Takahiro Suzuki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 889 days.

(21) Appl. No.: 17/527,586

(22) Filed: Nov. 16, 2021

(65) Prior Publication Data
US 2022/0161679 A1    May 26, 2022

(30) Foreign Application Priority Data
Nov. 25, 2020  (JP) .................................. 2020-195504

(51) Int. Cl.
*H02J 7/00* (2006.01)
*B60L 53/68* (2019.01)
*G06Q 10/1093* (2023.01)
*H02J 7/14* (2006.01)

(52) U.S. Cl.
CPC .......... *B60L 53/68* (2019.02); *G06Q 10/1093* (2013.01); *H02J 7/00032* (2020.01); *H02J 7/0071* (2020.01); *H02J 7/00712* (2020.01); *H02J 7/007188* (2020.01)

(58) Field of Classification Search
CPC . B60L 53/68; H02J 7/00032; H02J 7/007188; H02J 7/00712; H02J 7/0071
USPC .................................................. 320/132, 134
See application file for complete search history.

(56) References Cited

U.S. PATENT DOCUMENTS

| | | | |
|---|---|---|---|
| 8,996,213 B2 | 3/2015 | Ishikawa et al. | |
| 10,953,765 B1* | 3/2021 | Sun | B60L 53/62 |
| 10,981,464 B1* | 4/2021 | Sun | B60L 53/51 |
| 2016/0297313 A1* | 10/2016 | Ono | H02J 3/322 |
| 2021/0078431 A1* | 3/2021 | Nagatochi | B60L 58/16 |
| 2021/0203177 A1* | 7/2021 | Peng | B60L 53/63 |
| 2021/0213848 A1* | 7/2021 | Sun | B60L 53/66 |
| 2021/0296666 A1* | 9/2021 | Kitamoto | H01M 8/04604 |
| 2021/0339647 A1* | 11/2021 | Batir | B60L 53/51 |
| 2022/0129815 A1* | 4/2022 | Shibano | G06Q 10/109 |

(Continued)

FOREIGN PATENT DOCUMENTS

| | | |
|---|---|---|
| JP | 2010-067061 A | 3/2010 |
| JP | 2012-139025 A | 7/2012 |
| JP | 2013-070515 A | 4/2013 |

*Primary Examiner* — Alexis B Pacheco
(74) *Attorney, Agent, or Firm* — Finnegan, Henderson, Farabow, Garrett, and Dunner, LLP (57) ABSTRACT

A server includes a processor configured to: acquire user schedule information indicating an action schedule of a user and other person schedule information indicating an action schedule of another person associated with the user; estimate, based on the user schedule information, a power amount for a moving object that the user is allowed to use, the moving object including a rechargeable secondary battery; and control a charging device to charge the moving object based on the power amount and the other person schedule information.

15 Claims, 7 Drawing Sheets

(56) References Cited

U.S. PATENT DOCUMENTS

2022/0169120 A1\* 6/2022 Sugimoto ............... B60L 53/66
2024/0120742 A1\* 4/2024 Suzuki ................... B60L 58/12

\* cited by examiner

SERVER, CHARGING SYSTEM, AND COMPUTER READABLE RECORDING MEDIUM

The present application claims priority to and incorporates by reference the entire contents of Japanese Patent Application No. 2020-195504 filed in Japan on Nov. 25, 2020.

BACKGROUND

The present disclosure relates to a server, a charging system, and a computer readable recording medium.

There has been known a technique of estimating an amount of power required for arriving at a destination designated by a user based on travel history data and a scheduled travel route to the destination and controlling charging of a battery of an electric vehicle based on the required power amount. The travel history data includes types of a large number of electric vehicles, travel routes where the electric vehicles actually travel, and amounts of power consumption in the travel routes.

SUMMARY

In a case where a schedule of a user changes and the action schedule of the user changes, charging of a moving object may fail to be completed in time, or unnecessary charging may be executed.

There is a need for a server, a charging system, and a computer readable recording medium that are able to charge a moving object in accordance with an action schedule of a user.

According to one aspect of the present disclosure, there is provided a server including a processor configured to: acquire user schedule information indicating an action schedule of a user and other person schedule information indicating an action schedule of another person associated with the user; estimate, based on the user schedule information, a power amount for a moving object that the user is allowed to use, the moving object including a rechargeable secondary battery; and control a charging device to charge the moving object based on the power amount and the other person schedule information.

DETAILED DESCRIPTION

Hereinafter, a charging system according to an embodiment of the present disclosure will be described with reference to the drawings. Note that the present disclosure is not limited by the following embodiments. Furthermore, in the following description, the same sign is attached to the same part.

Figure 1:
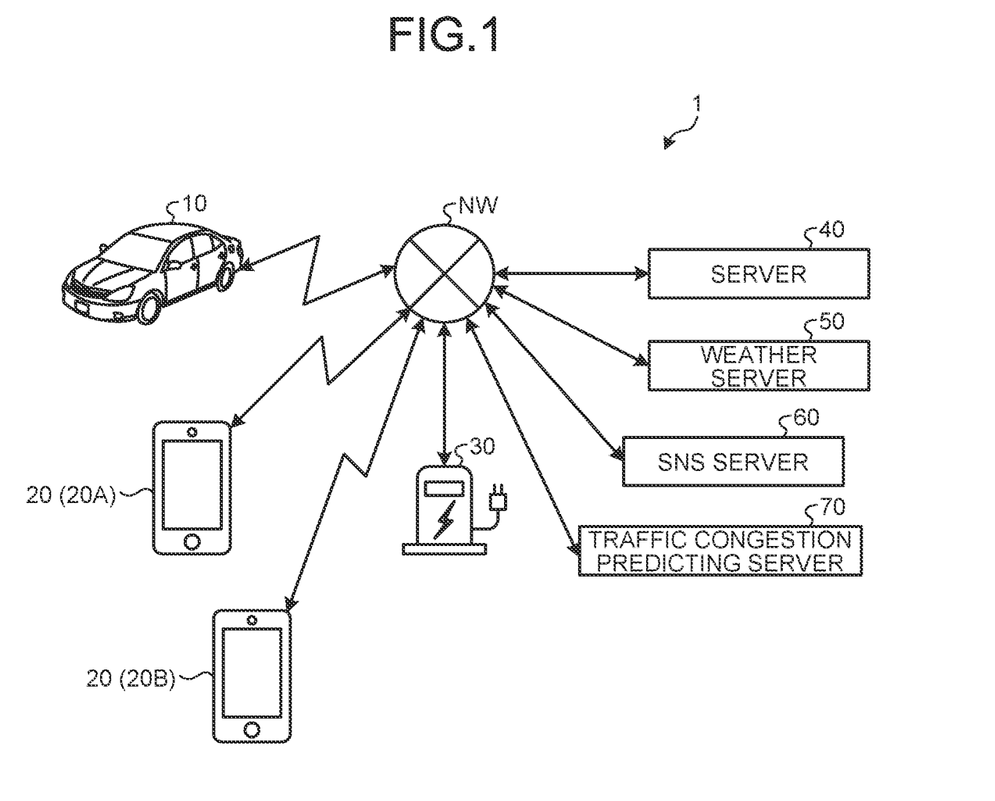
FIG. 1 schematically illustrates the configuration of a charging system according to a first embodiment.

FIG. 1 schematically illustrates the configuration of a charging system according to a first embodiment. A charging system 1 in FIG. 1 includes a moving object 10, a communication terminal 20 (hereinafter, referred to as "communication terminal 20A"), a communication terminal 20 (hereinafter, referred to as "communication terminal 20B") of another person, a charging device 30, a server 40, a weather server 50, a social networking service (SNS) server 60, and a traffic congestion predicting server 70. The communication terminal 20A is used by a user. The communication terminal 20B is associated with the user (communication terminal 20A). The weather server 50 stores a weather forecast predicted for each predetermined area. The SNS server 60 provides SNS, and manages information on each user and a message of each user. The traffic congestion predicting server 70 predicts traffic congestion of a traveling path where the moving object 10 travels. The charging system 1 may communicate with each other over a network NW. The network NW includes, for example, an internet network and a mobile phone network.

Figure 2:
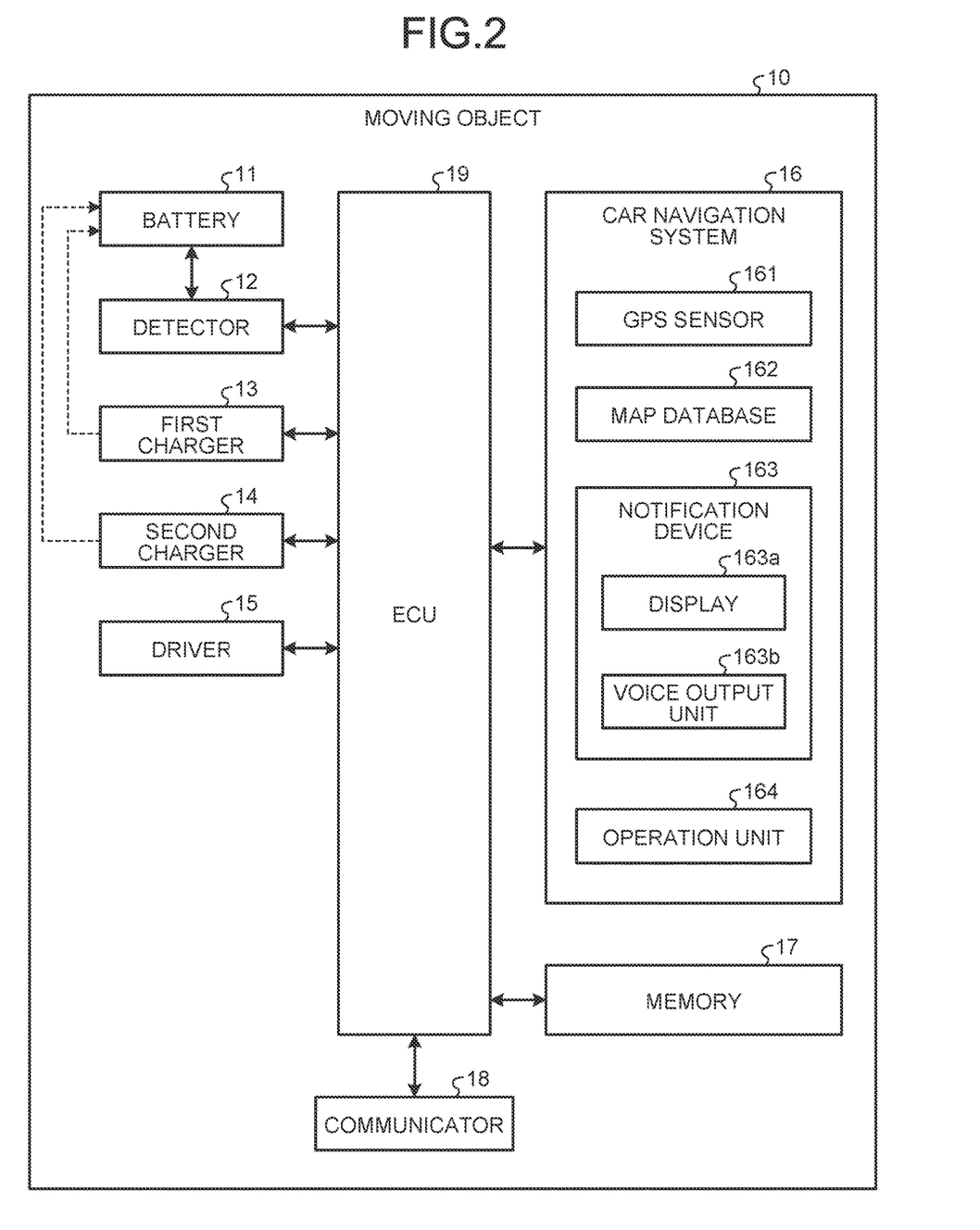
FIG. 2 is a block diagram illustrating the functional configuration of a moving object according to the first embodiment.

First, the functional configuration of the moving object 10 will be described. FIG. 2 is a block diagram illustrating the functional configuration of the moving object 10.

The moving object 10 in FIG. 2 includes a battery 11, a detector 12, a first charger 13, a second charger 14, a driver 15, a car navigation system 16, a memory 17, a communicator 18, and an electronic control unit (ECU) 19. Furthermore, although an automobile such as a battery electric vehicle (BEV), a plug-in hybrid electric vehicle (PHEV), and a fuel cell electric vehicle (FCEV) will be described as the moving object 10 below, these are not limitations. For example, an electric bicycle such as a motorcycle, a bicycle, and a scooter including a motor and a battery, a tricycle, a bus, a truck, a ship, and a drone may also be applied. Moreover, the moving object 10 may automatically move toward a destination under the control of the server 40 or the ECU 19. Of course, the moving object 10 may move toward the destination desired by a user who uses or boards the moving object 10 by the user operating a steering and the like.

The battery 11 includes a rechargeable secondary battery such as a nickel-hydrogen battery and a lithium-ion battery. The battery 11 stores high-voltage direct-current power for driving the moving object 10.

The detector 12 detects each of the state of charge (SOC), the temperature, the state of health (SOH), the voltage value, and the current value of the battery 11, and outputs the detection result to the ECU 19. The detector 12 includes various battery sensors, temperature sensors, and the like.

The first charger 13 is electrically connected to the battery 11, and may be electrically connected to the charging device 30 via a charging port. The first charger 13 converts (transforms) external power (direct-current power) supplied from the charging device 30 into voltage and power that may be charged to the battery 11, and outputs the converted voltage and power (power supply in usual charging mode). The first charger 13 includes an AC/DC converter, a DC/DC converter, and the like.

The second charger 14 is electrically connected to the battery 11, and may be electrically connected to the charging device 30 via a charging port. The second charger 14 converts (transforms) direct current supplied from the charging device 30 (power supply in rapid charging mode using DC charging) into voltage and power that may be charged to the battery 11, and outputs the converted voltage and power. The first charger 13 includes a DC/DC converter, a rectifier circuit, and the like.

The driver 15 supplies driving force to a driving wheel of the moving object 10 based on the power supplied from the battery 11 under the control of the ECU 19. The driver 15 includes a motor and the like.

The car navigation system 16 includes a global positioning system (GPS) sensor 161, a map database 162, a notification device 163, and an operation unit 164.

The GPS sensor 161 receives a signal from a plurality of GPS satellites or transmission antennas, and calculates the position (longitude and latitude) of the moving object 10 based on the received signal. The GPS sensor 161 includes a GPS reception sensor and the like. Note that, in one embodiment, the orientation accuracy of the moving object 10 may be improved by mounting a plurality of GPS sensors 161.

The map database 162 stores various pieces of map data. The map database 162 includes a recording medium such as a hard disk drive (HDD) and a solid state drive (SSD).

The notification device 163 includes a display 163a and a voice output unit 163b. The display 163a displays an image, a map, a video, and character information. The voice output unit 163b generates sound such as voice and warning sound. The display 163a includes a display device using a liquid crystal, organic electro luminescence (EL), and the like. The voice output unit 163b includes a speaker and the like.

The operation unit 164 receives inputs of user operations, and outputs signals in accordance with the received various operation contents to the ECU 19. The operation unit 164 includes a touch panel, a button, a switch, a jog dial, and the like.

The car navigation system 16 configured as described above superimposes the current position of the moving object 10 acquired by the GPS sensor 161 on a map corresponding to map data stored in the map database 162, thereby notifying the user of information including a road on which the moving object 10 is currently traveling, a route to a destination, and the like with the display 163a and the voice output unit 163b.

The memory 17 stores various pieces of information on the moving object 10. The memory 17 stores CAN data on the moving object 10 input from the ECU 19, various programs executed by the ECU 19, and the like. The memory 17 includes a dynamic random access memory (DRAM), a read only memory (ROM), a flash memory, a hard disk drive (HDD), a solid state drive (SSD), and the like.

The communicator 18 transmits CAN data and the like to the server 40 over the network NW under the control of the ECU 19. Here, the CAN data includes the state of charge (SOC), the SOH, and the like of the battery 11. The communicator 18 includes a communication module or the like capable of transmitting/receiving various pieces of information.

The ECU 19 includes a memory and a processor having hardware such as a central processing unit (CPU). The ECU 19 controls each unit of the moving object 10. The ECU 19 moves the moving object 10 to the charging device 30 or a predetermined place by controlling the driver 15 in accordance with a signal and an instruction transmitted from the server 40 via the communicator 18, the position of the moving object 10 detected by the car navigation system 16, and the like.

Figure 3:
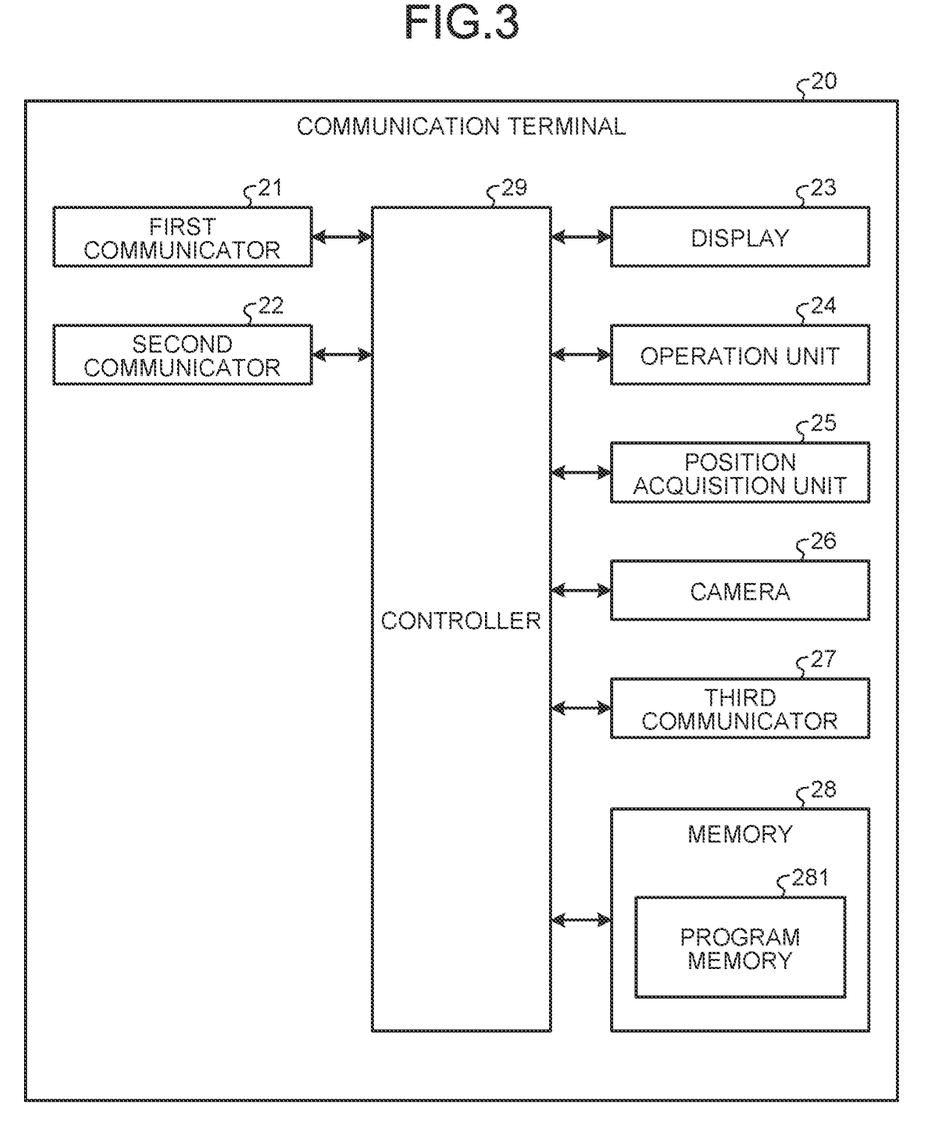
FIG. 3 is a block diagram illustrating the functional configuration of a communication terminal according to the first embodiment.

Next, the functional configuration of the communication terminal 20 will be described. FIG. 3 is a block diagram illustrating the functional configuration of the communication terminal 20. Note that the communication terminal 20A and the communication terminal 20B have the same configuration. Therefore, when either of the communication terminal 20A or the communication terminal 20B is referred to, the communication terminal will be simply described below as a communication terminal 20.

The communication terminal 20 in FIG. 3 includes a first communicator 21, a second communicator 22, a display 23, an operation unit 24, a position acquisition unit 25, a camera 26, a third communicator 27, a memory 28, and a controller 29. Note that, although the communication terminal 20 will be described below as a mobile phone, the communication terminal 20 is not limited to the mobile phone. For example, a tablet terminal, a wearable device, and the like may be applied. Here, examples of the wearable device include a watch, an activity meter, and the like including a sensor, a communication module, and the like. The sensor may detect biological information on a user who wears the wearable device. The communication module may communicate with the outside. Furthermore, the biological information includes a body weight, a blood pressure, a pulse, a blood glucose level, a cholesterol level, a blood oxygen concentration, a body temperature, and the like.

The first communicator 21 receives various pieces of information from the moving object 10 or the wearable device under the control of the controller 29, and outputs the received various pieces of information to the controller 29. The first communicator 21 includes a communication module capable of performing, for example, Bluetooth (registered trademark) and the like.

The second communicator 22 receives various pieces of information from the moving object 10 or the wearable device under the control of the controller 29, and outputs the received various pieces of information to the controller 29. The second communicator 22 includes a communication module capable of performing Wi-Fi (registered trademark) and the like.

The display 23 displays various pieces of information under the control of the controller 29. The display 23 includes a display panel using a liquid crystal, organic electro luminescence (EL), and the like.

The operation unit 24 receives inputs of various user operations, and outputs signals corresponding to the received various operations to the controller 29. The operation unit 24 includes a touch panel, a switch, a button, and the like.

The position acquisition unit 25 acquires the position of the communication terminal 20, and outputs the acquired position to the controller 29. The position acquisition unit 25 is implemented by using a plurality of GPS reception sensors and the like.

The camera 26 generates image data by imaging a subject under the control of the controller 29, and outputs the image data to the controller 29. The camera 26 is implemented by using one or a plurality of optical systems and an image sensor of a charge coupled device (CCD) or a complementary metal oxide semiconductor (CMOS), which generate image data by capturing a subject image formed by the optical systems.

The third communicator 27 communicates with the server 40 via the network NW under the control of the controller 29, and transmits destination information on a destination set by a user via the operation unit 24. The third communicator 27 includes a communication module capable of performing a communication standard based on a mobile phone line, for example, a fourth-generation mobile communication system (4G), a fifth-generation mobile communication system (5G), and the like.

The memory 28 stores various pieces of information on the communication terminal 20 and various programs executed by the communication terminal 20. The memory 28 is implemented by using a DRAM, a ROM, a flash memory, an SSD, a memory card, and the like.

The controller 29 includes a memory and a processor having hardware such as a CPU. The controller 29 controls each unit of the communication terminal 20.

Figure 4:
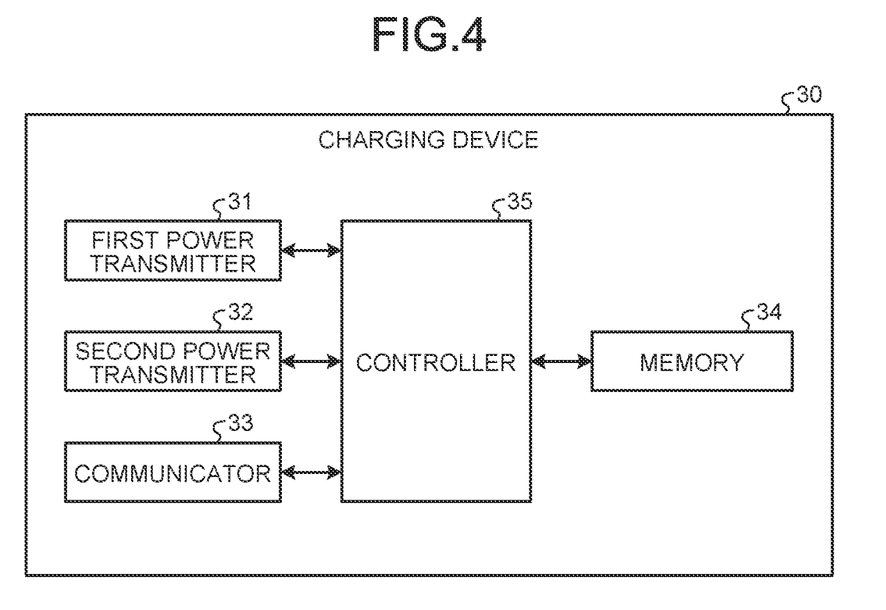
FIG. 4 is a block diagram illustrating the functional configuration of a charging device according to the first embodiment.

Next, the functional configuration of the charging device 30 will be described. FIG. 4 is a block diagram illustrating the functional configuration of the charging device 30.

The charging device 30 in FIG. 4 includes a first power transmitter 31, a second power transmitter 32, a communicator 33, a memory 34, and a controller 35.

The first charger 13 of the moving object 10 is connected to the first power transmitter 31. The first power transmitter 31 converts alternating current of a predetermined voltage value (e.g., 6600 V) supplied from an external alternating current power source into direct current of a predetermined value (e.g., 200 V), and thereby supplies the converted current to the first charger 13 (usual charging). The first power transmitter 31 includes a connector connectable to the first charger 13 of the moving object 10, a cable that transfers power to the connector, an AC/DC converter, an inverter, a rectifier circuit, a transformer, a circuit breaker, and the like. Note that the first power transmitter 31 may supply power in a non-contact manner (wireless AC charging). In the case, either of a magnetic field coupling method or an electric field coupling method may be adopted as a power supply method.

The second power transmitter 32 converts alternating current of a predetermined voltage value (e.g., 6600 V) supplied from an external alternating current power source into direct current of a predetermined voltage value (e.g., 500 V), and thereby supplies the converted current to the second charger (rapid charging mode). The second power transmitter 32 includes a connector connectable to the second charger 14 of the moving object 10, a cable that transfers power to the connector, an AC/DC converter, an inverter, a rectifier circuit, a transformer, a circuit breaker, and the like.

The communicator 33 communicates with the moving object 10, the communication terminal 20, and the server 40 over the network NW, and transmits/receives various pieces of information under the control of the controller 35. The communicator 33 includes a communication module and the like.

The memory 34 stores various pieces of information on the charging device 30. The memory 34 includes a DRAM, a ROM, a flash memory, an SSD, and the like.

The controller 35 includes a memory and a processor having hardware such as a CPU. The controller 35 controls each unit of the charging device 30.

Figure 5:
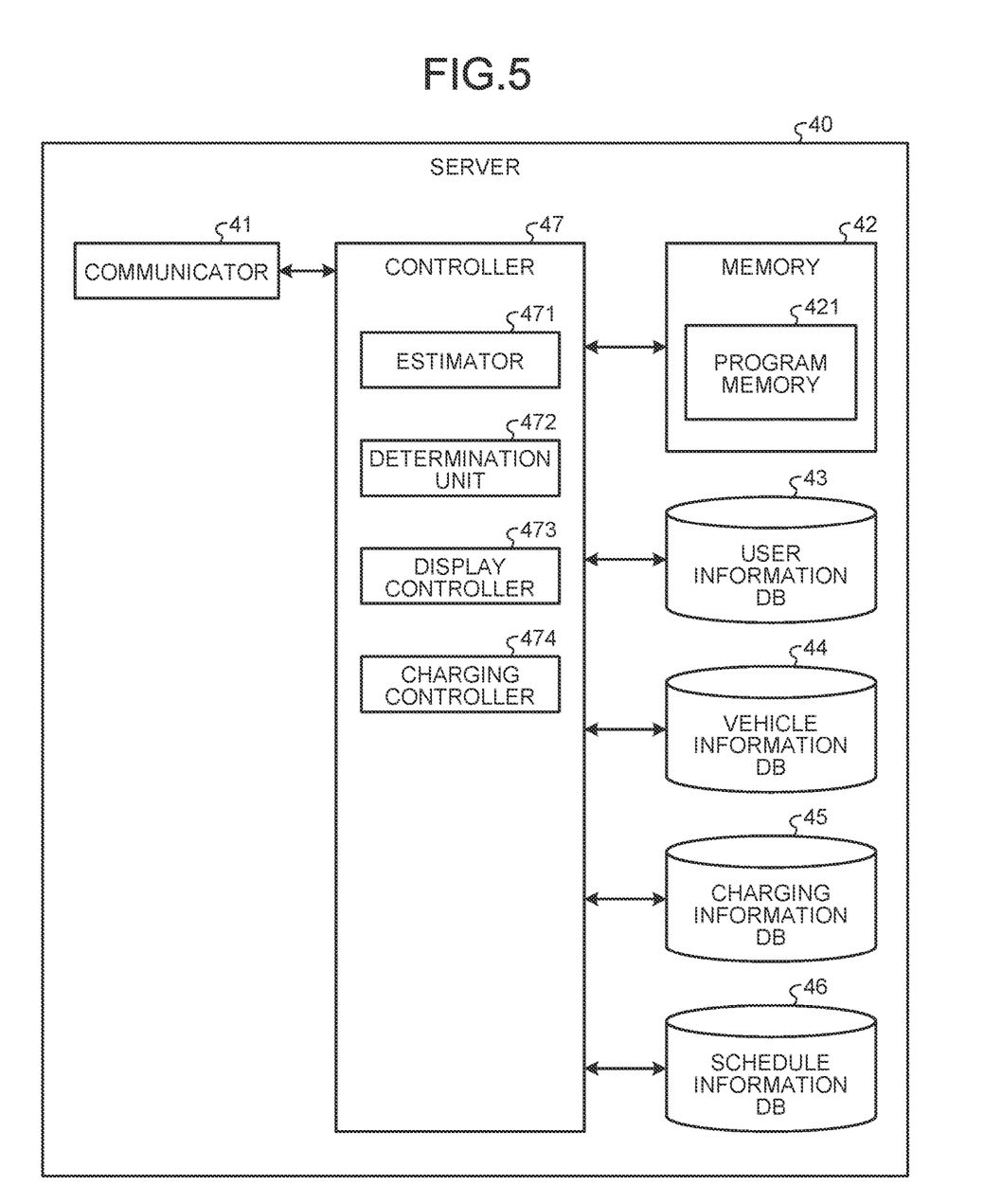
FIG. 5 is a block diagram illustrating the functional configuration of a server according to the first embodiment.

Next, the functional configuration of the server 40 will be described. FIG. 5 is a block diagram illustrating the functional configuration of the server 40.

The server 40 in FIG. 5 includes a communicator 41, a memory 42, a user information database 43 (hereinafter, referred to as "user information DB 43"), a vehicle information database 44 (hereinafter, referred to as "vehicle information DB 44"), a charging information database 45 (hereinafter, referred to as "charging information DB 45"), a schedule information database 46 (hereinafter, referred to as "schedule information DB 46"), and a controller 47.

The communicator 41 communicates with the moving object 10, the communication terminal 20, and the charging device 30 via the network NW under the control of the controller 47. The communicator 41 includes a communication module and the like.

The memory 42 stores various pieces of information on the server 40. Furthermore, the memory 42 includes a program memory 421 that stores various programs executed by the server 40. The memory 42 is implemented by using a DRAM, a ROM, a flash memory, an SSD, an HDD, a memory card, and the like.

The user information DB 43 stores user information. In the user information, terminal information for identifying the communication terminal 20 held by the user and user identification information for identifying the user are associated with each other. Here, the terminal information includes a device address, a telephone number, an e-mail address, and the like. Furthermore, the user identification information includes a name, an address, a birth date of a user, and an action history of the user based on information on the position of the communication terminal 20 of the user, and the like. Note that the action history may include a purchase history and the like of the user based on electronic money registered in the communication terminal 20 of the user. The user information DB 43 includes an HDD, an SSD, and the like.

The vehicle information DB 44 stores vehicle information. In the vehicle information, vehicle identification information for identifying the moving object 10, information on the current state of the moving object 10, and information on the current position of the moving object 10 are associated with each other. The vehicle identification information includes the vehicle type name, the model year, the owner, and the like of the moving object 10. Furthermore, the state information includes the state of charge of the battery 11 of the moving object 10, CAN data, and the like. The vehicle information DB 44 includes an HDD, an SSD, and the like.

The charging information DB 45 stores charging information. In the charging information, charging identification information for identifying the charging device 30, charging status information indicating the current charging status of the charging device 30, and installation information indicating an installation place of the charging device 30 are associated with each other. The charging identification information includes a mode of charging (a charging mode such as a usual charging mode (single-phase AC 200 V or 100 V) or a rapid charging mode) the charging device 30, the shape of a charging connector, a device address, and the like. The charging status information includes whether or not the moving object 10 is currently charged by the charging device 30, the scheduled completion time of charging of the battery 11 of the moving object 10, the charging status of the battery of the moving object 10, and the like. The charging information DB 45 includes an HDD, an SSD, and the like.

The schedule information DB 46 stores user schedule information. In the user schedule information, a device ID for identifying the communication terminal 20A held by a user, identification information for identifying the user, and a user schedule of the user input by the user are associated with each other. Here, the user schedule includes a position where the moving object 10 is scheduled to be used, a destination of the user, a scheduled use time of the user, a date and time when the user uses the moving object 10, vehicle identification information on the moving object 10 used by the user, presence or absence of a going out schedule of the user, a picking up/dropping off position where another person associated with the user is picked up or dropped off, a picking up/dropping off time, the number of users of the moving object 10, and the like. Furthermore, the schedule information DB 46 stores other person schedule information. In the other person schedule information, a device ID for identifying the communication terminal 20B held by another person, identification information for identifying the other person, and an another-person user schedule input by the other person are associated with each other. Here, the other person schedule includes the picking up/dropping off position, the picking up/dropping off time, and the like of the picking up/dropping off performed by the user. The schedule information DB 46 includes an HDD, an SSD, and the like.

The controller 47 includes a memory and a processor having hardware such as a CPU, a field-programmable gate array (FPGA), and a graphics processing unit (GPU). The controller 47 controls each unit of the server 40. The controller 47 includes an estimator 471, a determination unit 472, a display controller 473, and a charging controller 474. Note that, in the first embodiment, the controller 47 functions as a processor.

The estimator 471 acquires user schedule information and other person schedule information. The user schedule information indicates an action schedule of a user. The other person schedule information indicates an action schedule of another person associated with the user. Specifically, the estimator 471 acquires the user schedule information and the other person schedule information from the schedule information DB 46. Then, the estimator 471 estimates an amount of power required for the moving object 10 capable of being used by the user based on the user schedule information. Specifically, the estimator 471 estimates an amount of power required by the moving object 10 based on a use start position where the moving object 10 is used and a picking up/dropping off position in the user schedule information. Note that the estimator 471 may read a learned model stored in the program memory 421, input the use start position of the user and the picking up/dropping off position as input data to the read learned model, and output the amount of required power as output data. The learned model is formed by using a deep neural network (DNN) as machine learning, for example. Note that any type of network of DNN may be adopted as long as the estimator 471 may use the type. Specifically, the type of machine learning is not particularly limited. For example, it is sufficient if a type of machine learning is adopted. In the type, teacher data and learning data are provided. In the data, a distance and an amount of required power in the distance are associated. Learning is performed by inputting the teacher data and the learning data to a calculation model based on a multilayer neural network. Moreover, a method based on a DNN of a multilayer neural network such as a convolutional neural network (CNN) and a 3D-CNN may be used as a method of machine learning.

The determination unit 472 determines whether or not estimated starting time of the moving object 10 is made earlier than the scheduled starting time included in the action schedule of the user. Furthermore, the determination unit 472 determines whether or not another person has executed the action schedule of the user. Specifically, when the other person has arrived at the picking up/dropping off position included in the action schedule of the user, the determination unit 472 determines that the other person has executed the action schedule of the user based on the information on the position of the communication terminal 20B. Furthermore, the determination unit 472 determines whether or not the user has received a predetermined request from the other person. Specifically, when the content of a picking up/dropping off request to the user is included in a message (text data) of the communication terminal 20A of the user from the communication terminal 20B of the other person via the communicator 41, the determination unit 472 determines whether or not the user has received a predetermined request from the other person.

The display controller 473 outputs information indicating that the mode of charging the moving object 10 performed by the charging device 30 has been switched to the rapid charging mode and a charging completion time to the communication terminal 20 of the user via the communicator 41.

The charging controller 474 charges the moving object 10 by controlling the charging device 30 such that the required power amount estimated by the estimator 471 is achieved via the communicator 41.

Figure 6:
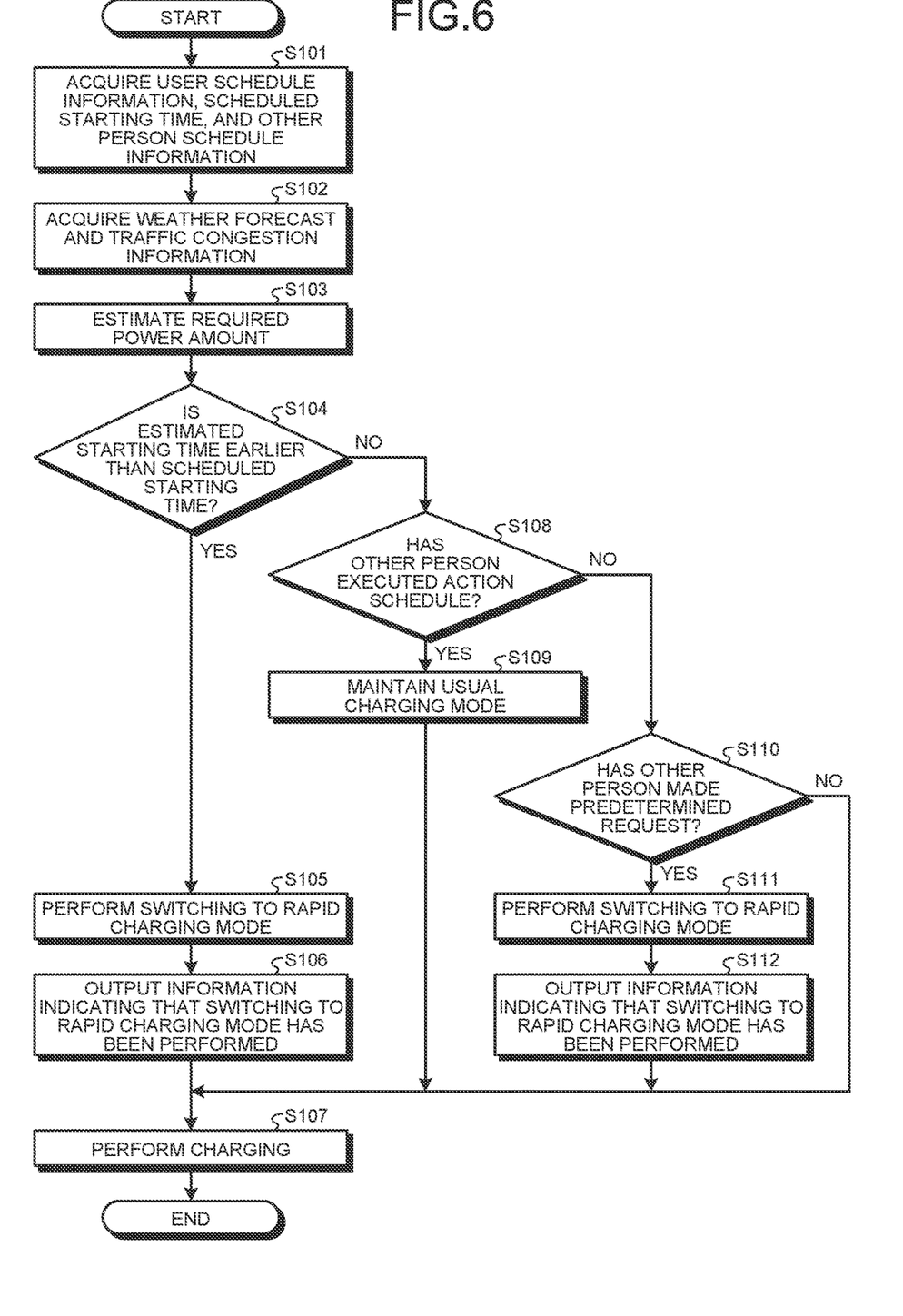
FIG. 6 is a flowchart outlining processing executed by the server according to the first embodiment.

Next, processing executed by the server 40 according to the first embodiment will be described. FIG. 6 is a flowchart outlining processing executed by the server 40.

As illustrated in FIG. 6, first, the estimator 471 acquires user schedule information, a scheduled starting time, and other person schedule information (Step S101). Specifically, the estimator 471 acquires the user schedule information corresponding to the device ID of the communication terminal 20A of the user, the scheduled starting time, and the other person schedule information corresponding to the device ID of the communication terminal 20B of the other person from the schedule information DB 46. Note that the estimator 471 may acquire a user schedule, the scheduled user start time, and a other person schedule input by an operation of the user or the other person from the communication terminal 20 via the communicator 41.

Subsequently, the estimator 471 acquires a weather forecast and traffic congestion information via the communicator 41 (Step S102). Specifically, the estimator 471 acquires the picking up/dropping off position at the scheduled starting time and weather information at the picking up/dropping off time included in the user schedule information from the weather server 50 via the communicator 41. Moreover, the estimator 471 acquires traffic congestion information at the picking up/dropping off time on a picking up/dropping off route at the scheduled starting time from the traffic congestion predicting server 70.

Thereafter, the estimator 471 estimates an amount of power required by the moving object 10 scheduled to be used by the user based on the user schedule information (Step S103). Specifically, the estimator 471 estimates the amount of power required by the moving object 10 scheduled to be used by the user based on the use position where the moving object 10 is used and the picking up/dropping off position included in the user schedule information. In the case, the estimator 471 estimates the required power amount in consideration of the weather information and the traffic congestion information. For example, when a traffic congestion occurs at a scheduled starting time, the estimator 471 sets a large required power amount for charging the moving object 10. Moreover, when temperature at the scheduled starting time is predetermined value or more based on the weather information, the estimator 471 sets larger required power amount for charging the moving object 10 as the temperature is increased.

Subsequently, the determination unit 472 determines whether or not the estimated starting time of the moving object 10 is made earlier than the scheduled starting time included in the action schedule of the user (Step S104). Specifically, when acquiring information indicating that a time earlier than a scheduled starting time included in the action schedule of the user is input in a message (text data) of a picking up/dropping off request from the communication terminal 20B of another person from the communication terminal 20A or the SNS server 60 via the communicator 41, the determination unit 472 determines whether or not the estimated starting time of the moving object 10 is made earlier than the scheduled starting time included in the action schedule of the user. Furthermore, when acquiring information indicating that information on the position of the communication terminal 20B of the other person is approaching the picking up/dropping off position included in the action schedule of the user earlier than the scheduled starting time from the communication terminal 20A via the communicator 41, the determination unit 472 determines whether or not the estimated starting time of the moving object 10 is made earlier than the scheduled starting time included in the action schedule of the user. When the determination unit 472 determines that the estimated starting time of the moving object 10 is made earlier than the scheduled starting time included in the action schedule of the user (Step S104: Yes), the server 40 proceeds to Step S105 described later. In contrast, when the determination unit 472 determines that the estimated starting time of the moving object 10 is not made earlier than the scheduled starting time included in the action schedule of the user (Step S104: No), the server 40 proceeds to Step S108 described later.

In Step S105, the charging controller 474 controls the charging device 30 such that the mode of charging the moving object 10 performed by the charging device 30 is switched to the rapid charging mode and the charging is performed via the communicator 41. Specifically, the charging controller 474 controls the controller 35 of the charging device 30 via the communicator 41 to switch the charging mode from the usual charging mode performed by the first power transmitter 31 to the rapid charging mode performed by the second power transmitter 32. As a result, the moving object 10 may perform charging to satisfy a required power amount even when the estimated starting time of the user is made earlier.

Figure 7:
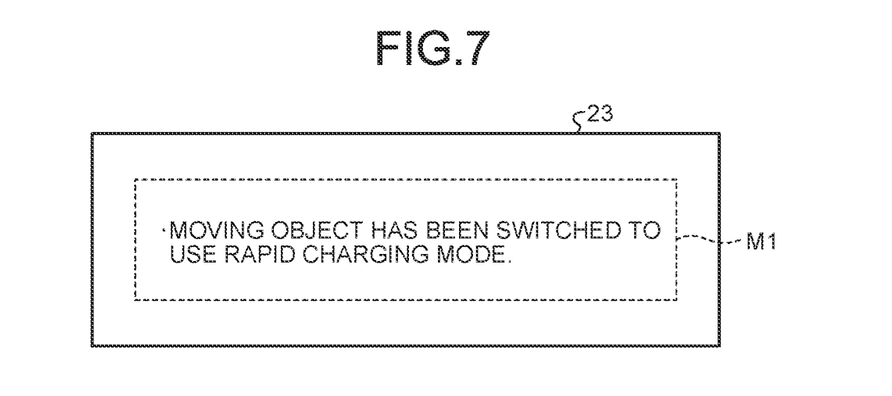
FIG. 7 illustrates one example of an image displayed by the communication terminal according to the first embodiment.

Subsequently, the display controller 473 outputs information indicating that the mode of charging the moving object 10 performed by the charging device 30 has been switched to the rapid charging mode and a charging completion time to the communication terminal 20 of the user (Step S106). Specifically, as illustrated in FIG. 7, the display controller 473 outputs information M1 indicating that the mode of charging the moving object 10 performed by the charging device 30 has been switched to the rapid charging mode and a charging completion time to the communication terminal 20 of the user. In the case, the communication terminal 20 causes the display 23 to display the information M1 indicating that the mode of charging the moving object 10 performed by the charging device 30 has been switched to the rapid charging mode and a charging completion time under the control of the controller 29.

Thereafter, the charging controller 474 charges the moving object 10 by controlling the charging device 30 such that the required power amount estimated by the estimator 471 is achieved (Step S107). After Step S107, the server 40 ends the processing.

In Step S108, the determination unit 472 determines whether or not another person has executed the action schedule of the user. Specifically, when the other person has arrived at the picking up/dropping off position included in the action schedule of the user, the determination unit 472 determines that the other person has executed the action schedule of the user based on the information on the position of the communication terminal 20B. Furthermore, when an action schedule of a user, for example, the content that picking up/dropping off is performed or the content that picking up/dropping off has been performed is included in a message (text data) of the communication terminal 20A from the communication terminal 20B of another person, the determination unit 472 determines whether or not the other person has executed the action schedule of the user via the communicator 41. When the determination unit 472 determines that the other person has executed the action schedule of the user (Step S108: Yes), the server 40 proceeds to Step S109 described later. In contrast, when the determination unit 472 determines that the other person has not executed the action schedule of the user (Step S108: No), the server 40 proceeds to Step S110 described later.

In Step S109, the charging controller 474 maintains the mode of charging the moving object 10 performed by the charging device 30 at the usual charging mode via the communicator 41. After Step S109, the server 40 proceeds to Step S107.

In Step S110, the determination unit 472 determines whether or not the user has received a predetermined request from the other person. Specifically, when the content of a picking up/dropping off request to the user is included in a message (text data) of the communication terminal 20A of the user from the communication terminal 20B of the other person via the communicator 41, the determination unit 472 determines whether or not the user has received a predetermined request from the other person. When the determination unit 472 determines that the user has received a predetermined request from the other person (Step S110: Yes), the server 40 proceeds to Step S111 described later. In contrast, when the determination unit 472 determines that the user has not received a predetermined request from the other person (Step S110: No), the server 40 proceeds to Step S107 while maintaining the mode of charging the moving object 10 performed by the charging device 30 at the usual charging mode via the communicator 41.

In Step S111, the charging controller 474 controls the charging device 30 such that the mode of charging the moving object 10 performed by the charging device 30 is switched to the rapid charging mode and the charging is performed via the communicator 41. Specifically, the charging controller 474 controls the controller 35 of the charging device 30 via the communicator 41 to switch the charging mode from the usual charging mode performed by the first power transmitter 31 to the rapid charging mode performed by the second power transmitter 32. As a result, the moving object 10 may perform charging to satisfy a required power amount even when the estimated starting time of the user is made earlier.

Subsequently, the display controller 473 outputs information indicating that the mode of charging the moving object 10 performed by the charging device 30 has been switched to the rapid charging mode and a charging completion time to the communication terminal 20 of the user (Step S112). After Step S112, the server 40 proceeds to Step S107.

According to the above-described first embodiment, the estimator 471 acquires user schedule information and other person schedule information. The user schedule information indicates an action schedule of a user. The other person schedule information indicates an action schedule of another person associated with the user. Then, the estimator 471 estimates an amount of power required for the moving object 10 capable of being used by the user based on the user schedule information. Then, the charging controller 474 charges the moving object 10 with the charging device 30 based on an amount of power required by the moving object 10 estimated by the estimator 471 and other person schedule information. As a result, the moving object 10 may be charged in accordance with the action schedule of the user.

Furthermore, according to the first embodiment, the estimator 471 acquires the scheduled starting time when the user starts to use the moving object 10. Then, the determination unit 472 determines whether or not the estimated starting time is made earlier than the scheduled starting time when the user starts to use the moving object 10 based on the scheduled starting time acquired by the estimator 471 and the user schedule information. Thereafter, when the estimated starting time is made earlier than the scheduled starting time when the user starts to use the moving object 10 by the determination unit 472, the charging controller 474 switches the mode of charging the moving object 10 with the charging device from the usual charging to the rapid charging mode. As a result, even when the estimated starting time of the moving object 10 of the user is made earlier than the scheduled starting time, the shortage of the SOC of the moving object 10 may be prevented.

Furthermore, according to the first embodiment, the determination unit 472 determines whether or not the other person has executed the action schedule of the user. Then, when the determination unit 472 determines that the other person has executed the action schedule of the user, the charging controller 474 maintains the mode of charging the moving object 10 with the charging device 30. Therefore, unnecessary charging may be prevented, and deterioration of the battery 11 of the moving object 10 due to the rapid charging mode may be prevented.

Furthermore, according to the first embodiment, the determination unit 472 determines whether or not the user has received a predetermined request from the other person. Then, when the determination unit 472 determines that the other person has made a predetermined request, the charging controller 474 switches the mode of charging the moving object 10 with the charging device 30 from the usual charging mode to the rapid charging mode. As a result, even when the estimated starting time of the moving object 10 of the user is made earlier than the scheduled starting time, the shortage of the SOC of the moving object 10 may be prevented.

Furthermore, according to the first embodiment, the display controller 473 outputs information indicating that the charging mode performed by the charging device 30 is switched to the rapid charging mode to the communication terminal 20A of the user. As a result, the user may grasp the fact that the moving object 10 scheduled to be used is switched to use the rapid charging mode.

Furthermore, according to the first embodiment, when the estimator 471 determines that a traffic congestion occurs at the scheduled starting time of the moving object 10 of the user, the charging device 30 charges the moving object 10 in consideration of the traffic congestion. As a result, the shortage of the SOC of the moving object 10 due to a traffic congestion may be prevented.

Furthermore, according to the first embodiment, the estimator 471 acquires a weather forecast at the scheduled starting time when the user starts to use the moving object 10, and charges the moving object 10 with the charging device 30 in consideration of the weather forecast. As a result, even when the user uses an air conditioner for increased temperature, the shortage of the SOC of the moving object 10 may be prevented.

Next, a second embodiment will be described. A charging system according to the second embodiment has a functional configuration different from that of the charging device 30 of the charging system 1 according to the first embodiment. Hereinafter, the functional configuration of a charging device according to the second embodiment will be described.

Figure 8:
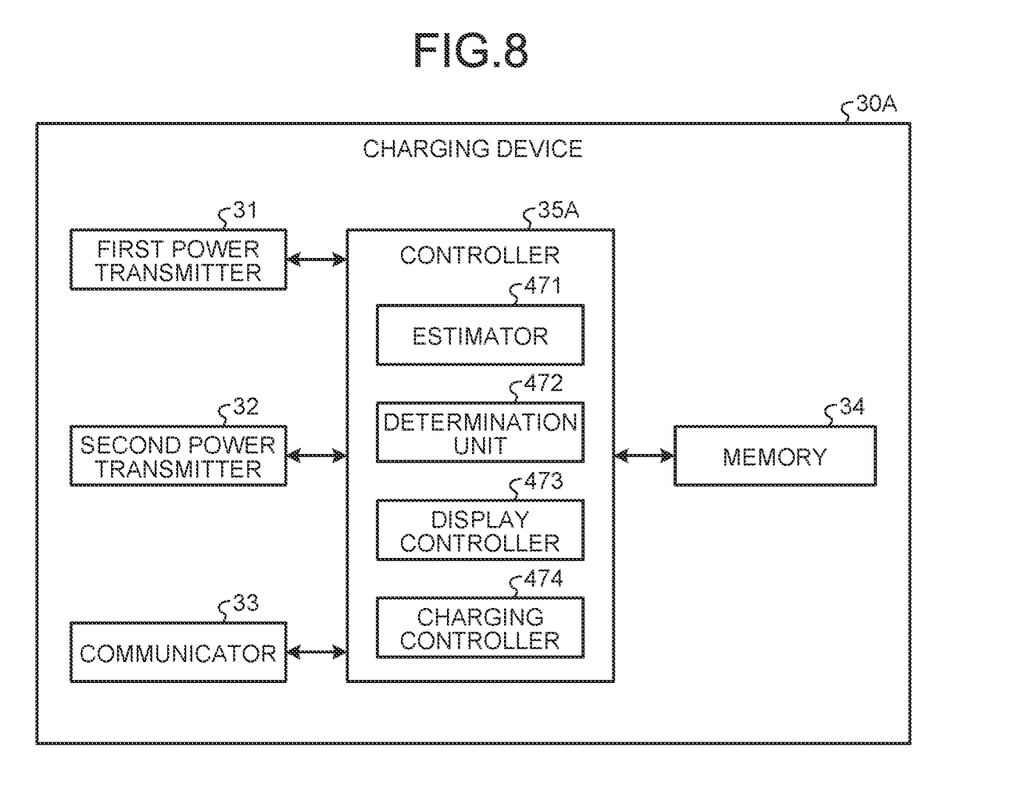
FIG. 8 is a block diagram illustrating the functional configuration of a charging device according to a second embodiment.

FIG. 8 is a block diagram illustrating the functional configuration of the charging device according to the second embodiment. A charging device 30A in FIG. 8 includes a controller 35A instead of the controller 35 of the charging device 30 according to the first embodiment.

The controller 35A includes the estimator 471, the determination unit 472, the display controller 473, and the charging controller 474 of the controller 47 provided in the server 40 according to the first embodiment. Note that, in the second embodiment, the controller 35A functions as a processor.

The charging device 30A configured as described above performs processing similar to that of the server 40 according to the first embodiment. As a result, the moving object may be charged in accordance with the action schedule of the user.

Furthermore, in the charging systems according to the first and second embodiments, a "unit" may be replaced with a "circuit" or the like. For example, a controller may be replaced with a control circuit.

Furthermore, a program to be executed by the charging systems according to the first and second embodiments may be provided after being stored in a computer-readable recording medium such as a CD-ROM, a flexible disk (FD), a CD-R, a digital versatile disk (DVD), a USB medium, and a flash memory as file data in an installable format or an executable format.

Furthermore, the program to be executed by the charging systems according to the first and second embodiments may be provided by being stored in a computer connected to a network such as the Internet and downloaded via the network.

Note that, although, in the description of the flowcharts in the present specification, the context of processing between steps is clearly indicated by using expressions such as "first", "thereafter", and "subsequently", the order of processing necessary for implementing the embodiment is not uniquely determined by these expressions. That is, the order of processing in the flowcharts described in the present specification may be changed within a consistent range.

According to the present disclosure, an effect of allowing a moving object to be charged in accordance with an action schedule of a user.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A server comprising
a processor configured to:
acquire user schedule information indicating an action schedule of a user and other person schedule information indicating an action schedule of another person associated with the user;
estimate, based on the user schedule information, a power amount for a moving object that the user is allowed to use, the moving object including a rechargeable secondary battery;
control a charging device to charge the moving object based on the power amount and the other person schedule information;
acquire a scheduled starting time of starting a use of the moving object;
acquire a weather forecast at the scheduled starting time;
charge the moving object with the charging device in consideration of the weather forecast;
determine whether or not an estimated starting time is earlier than the scheduled starting time based on the scheduled starting time and the user schedule information; and
switch a charging mode of the charging device from a usual charging mode to a rapid charging mode in a case where the estimated starting time is earlier than the scheduled starting time.

2. The server according to claim 1, wherein the processor is configured to:
determine whether or not the other person has executed the action schedule of the user; and
maintain the charging mode of the charging device in a case where the other person has executed the action schedule of the user.

3. The server according to claim 1, wherein the processor is configured to:
determine whether or not the user has received a predetermined request from the other person; and
switch the charging mode of the charging device from the usual charging mode to the rapid charging mode in a case where the other person has made the predetermined request.

4. The server according to claim 1, wherein the processor is configured to output information indicating that switching to the rapid charging mode is performed to a communication terminal of the user.

5. The server according to claim 1, wherein the processor is configured to:
determine whether or not a traffic congestion occurs at the scheduled starting time; and
charge the moving object with the charging device in consideration of the traffic congestion in a case where the traffic congestion occurs at the scheduled starting time.

6. A charging system comprising:
a moving object including a rechargeable secondary battery; and
a server including a processor configured to:
acquire user schedule information indicating an action schedule of a user and other person schedule information indicating an action schedule of another person associated with the user;
estimate, based on the user schedule information, a power amount for the moving object;
control a charging device to charge the moving object based on the power amount and the other person schedule information;
acquire a scheduled starting time of starting a use of the moving object;
acquire a weather forecast at the scheduled starting time;
charge the moving object with the charging device in consideration of the weather forecast;
determine whether or not an estimated starting time is earlier than the scheduled starting time based on the scheduled starting time and the user schedule information; and
switch a charging mode of the charging device from a usual charging mode to a rapid charging mode in a case where the estimated starting time is earlier than the scheduled starting time.

7. The charging system according to claim 6, wherein the processor is configured to:
determine whether or not the other person has executed the action schedule of the user; and
maintain the charging mode of the charging device in a case where the other person has executed the action schedule of the user.

8. The charging system according to claim 6, wherein the processor is configured to:
determine whether or not the user has received a predetermined request from the other person; and
switch the charging mode of the charging device from the usual charging mode to the rapid charging mode in a case where the other person has made the predetermined request.

9. The charging system according to claim 6, wherein the processor is configured to output information indicating that switching to the rapid charging mode is performed to a communication terminal of the user.

10. The charging system according to claim 6, wherein the processor is configured to:
determine whether or not a traffic congestion occurs at the scheduled starting time; and
charge the moving object with the charging device in consideration of the traffic congestion in a case where the traffic congestion occurs at the scheduled starting time.

11. A non-transitory computer-readable recording medium on which an executable program is recorded, the program causing a processor of a computer to execute:
acquiring user schedule information indicating an action schedule of a user and other person schedule information indicating an action schedule of another person associated with the user;
estimating, based on the user schedule information, a power amount for a moving object that the user is allowed to use, the moving object including a rechargeable secondary battery;
controlling a charging device to charge the moving object based on the power amount and the other person schedule information;
acquiring a scheduled starting time of starting a use of the moving object;
acquiring a weather forecast at the scheduled starting time;
charging the moving object with the charging device in consideration of the weather forecast;

determining whether or not an estimated starting time is earlier than the scheduled starting time based on the scheduled starting time and the user schedule information; and switching a charging mode of the charging device from a usual charging mode to a rapid charging mode in a case where the estimated starting time is earlier than the scheduled starting time.

12. The non-transitory computer-readable recording medium according to claim 11, wherein the program causes the processor to execute:

determining whether or not the other person has executed the action schedule of the user; and maintaining the charging mode of the charging device in a case where the other person has executed the action schedule of the user.

13. The non-transitory computer-readable recording medium according to claim 11, wherein the program causes the processor to execute:

determining whether or not the user has received a predetermined request from the other person; and switching the charging mode of the charging device from the usual charging mode to the rapid charging mode in a case where the other person has made the predetermined request.

14. The non-transitory computer-readable recording medium according to claim 11, wherein the program causes the processor to execute outputting information indicating that switching to the rapid charging mode is performed to a communication terminal of the user.

15. The non-transitory computer-readable recording medium according to claim 11, wherein the program causes the processor to execute:

determining whether or not a traffic congestion occurs at the scheduled starting time; and charging the moving object with the charging device in consideration of the traffic congestion in a case where the traffic congestion occurs at the scheduled starting time.

* * * * *